FIG. I

Dec. 19, 1961 T. O. ADAMS 3,013,708
ROLL FEED
Filed Jan. 13, 1960 9 Sheets-Sheet 2

INVENTOR.
THOMAS O. ADAMS
BY
Williams, Tilbury & Golrick
ATTORNEYS

Dec. 19, 1961 T. O. ADAMS 3,013,708
ROLL FEED

Filed Jan. 13, 1960 9 Sheets-Sheet 3

INVENTOR.
THOMAS O. ADAMS
BY
Williams, Tilbury & Gobrick
ATTORNEYS

Dec. 19, 1961  T. O. ADAMS  3,013,708
ROLL FEED
Filed Jan. 13, 1960  9 Sheets-Sheet 6

*INVENTOR.*
THOMAS O. ADAMS
BY
*Williams, Tilbury & Gobrick*
ATTORNEYS

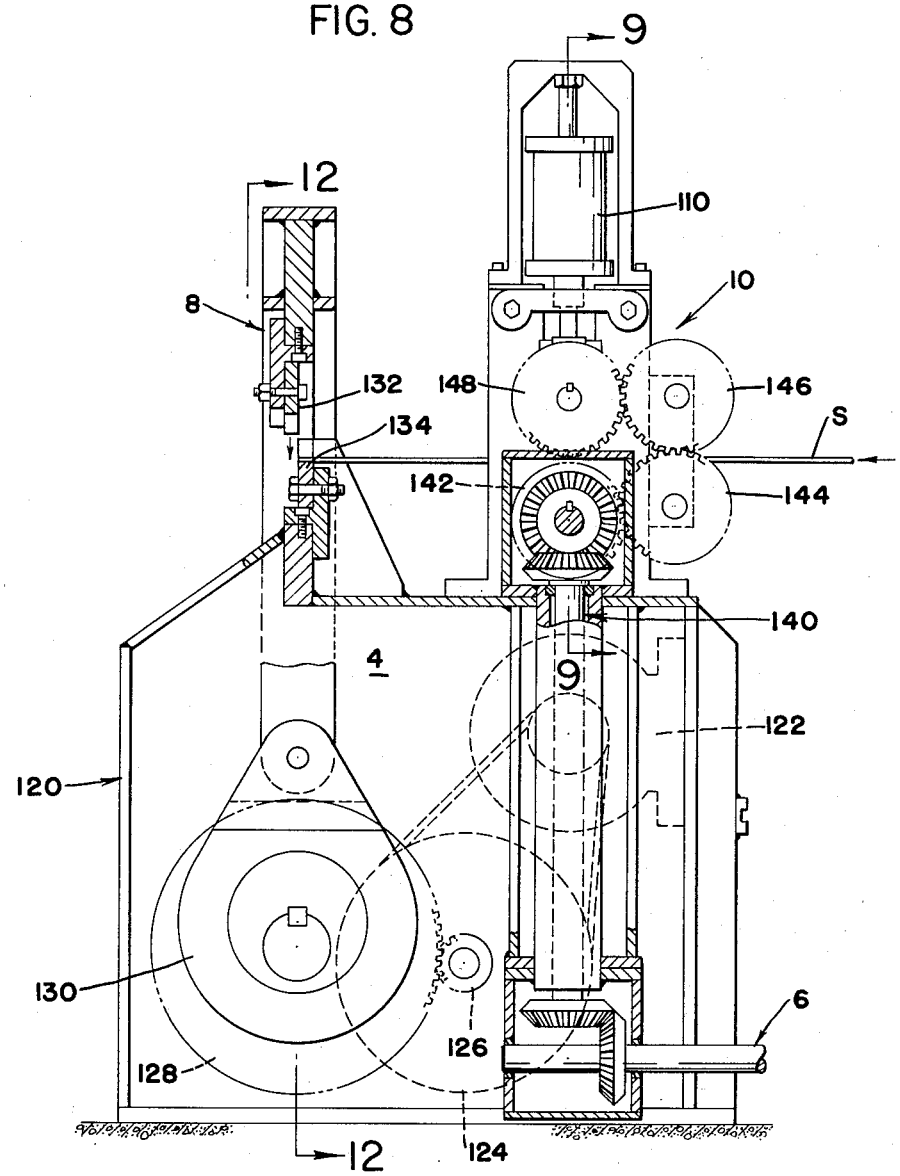

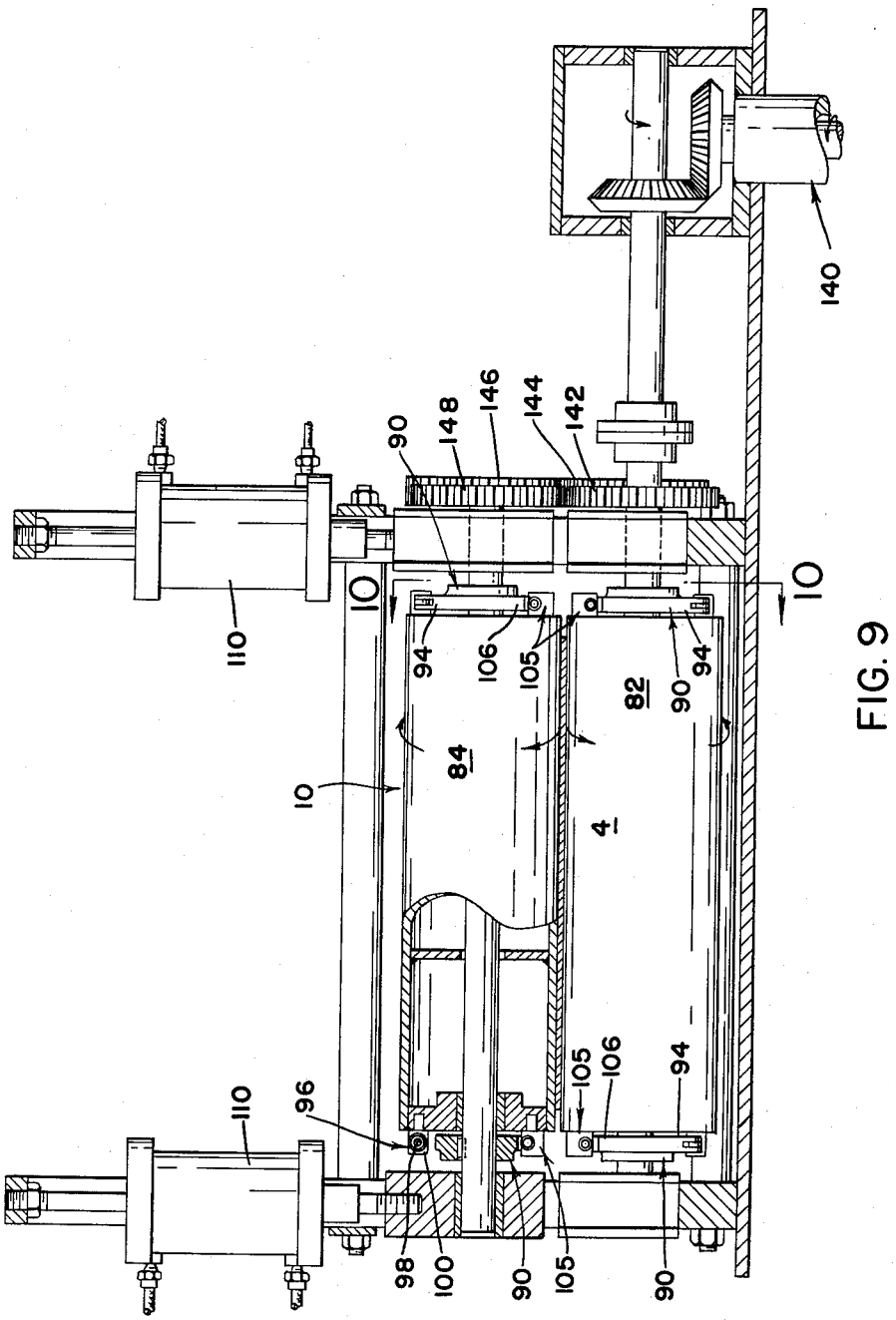

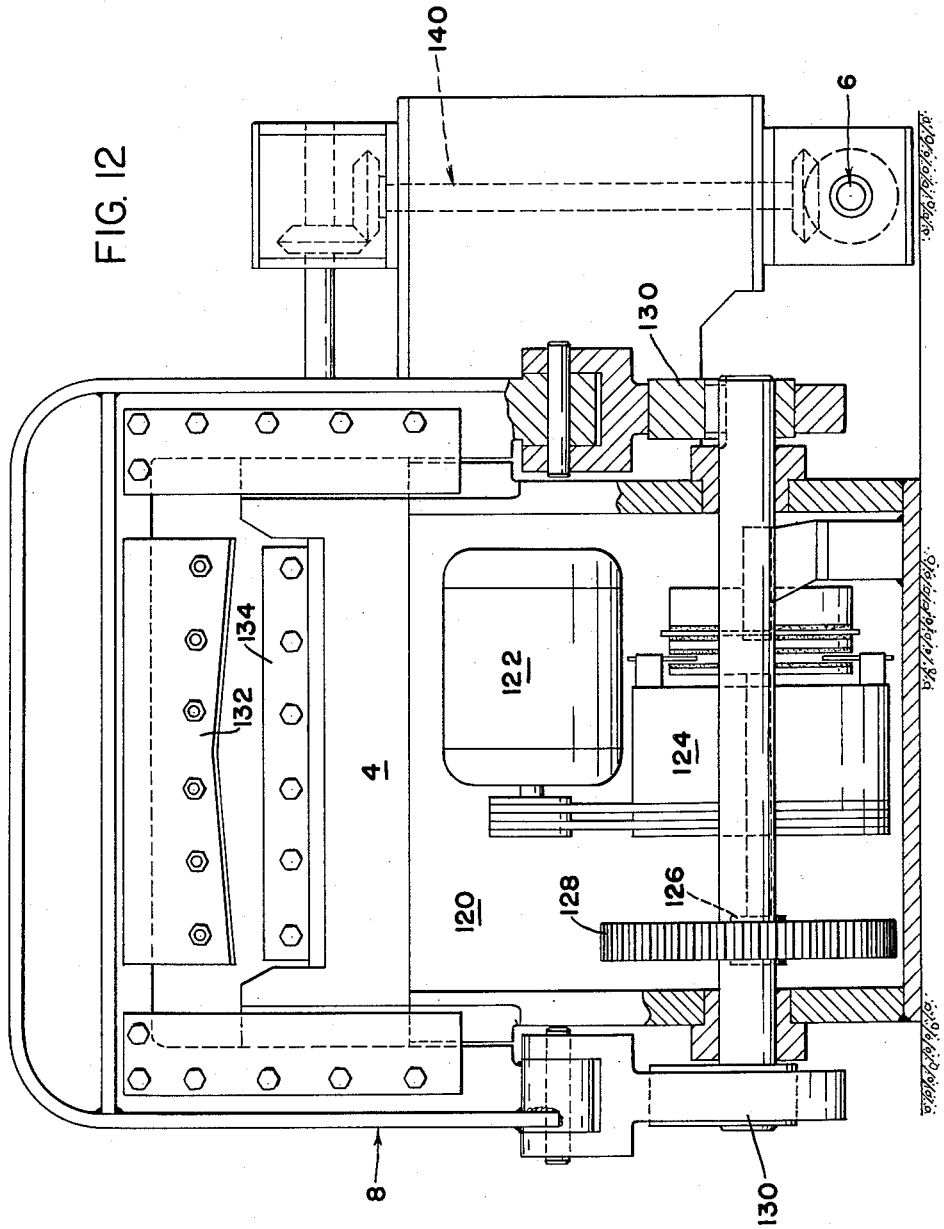

United States Patent Office 3,013,708
Patented Dec. 19, 1961

3,013,708
ROLL FEED
Thomas O. Adams, Canton, Ohio, assignor to E. W. Bliss Company, Canton, Ohio, a corporation of Delaware
Filed Jan. 13, 1960, Ser. No. 2,253
7 Claims. (Cl. 226—156)

This invention relates to roll feeds in general, and more particularly to a heavy duty roll feed for use in association with industrial presses and similar related machinery.

There has been a long felt need in the press feeding equipment field for a satisfactory heavy duty, high speed feed for coil stock. For the most part, present roll feeds are either too slow, too costly to build, or too costly to maintain. It is believed that the subject invention overcomes these objectionable features of presently available roll feeds, and to this end, it is among the objects of this invention to provide a roll feed which is of the heavy duty variety; which is self-powered so as to be adapted to an existing press or related equipment; which eliminates the need for an over-running clutch; which includes means for operating and synchronizing an outgoing roll feed and self-powered scrap cutter to work in association with the ingoing roll feed; which provides means for compensating for the elongation or stretch in strip as it is being worked upon by a press or other machinery; which will handle heavy stock high speed feeding requirements effortlessly and accurately; which may be used with any metal working machine; which may be moved from one machine to another; which is compact and requires a minimum of floor space; which is completely automatic in operation; which provides rapid setup and adjustment for job changes; which incorporates overload protection in its design; and which offers considerably greater flexibility and utility for general use than presently known roll feeds.

To the accomplishment of the foregoing and related objects, as well as other objects which will become apparent from a reading of the specification, the invention then consists of means hereinafter fully described and particularly pointed out in the claims, the annexed drawings, and the foregoing description.

Reference is now made to the drawings in which:

FIGURE 8 is an enlarged side elevational view of the outgoing roll feed and scrap cutter with parts in section to illustrate the drive portion of the mechanism;

FIGURE 9 is an enlarged fragmentary elevational view taken on line 9—9 of FIGURE 8 with parts in section of the outgoing feed rolls employed in association with and driven by the input feed roll mechanism;

Figure 1:
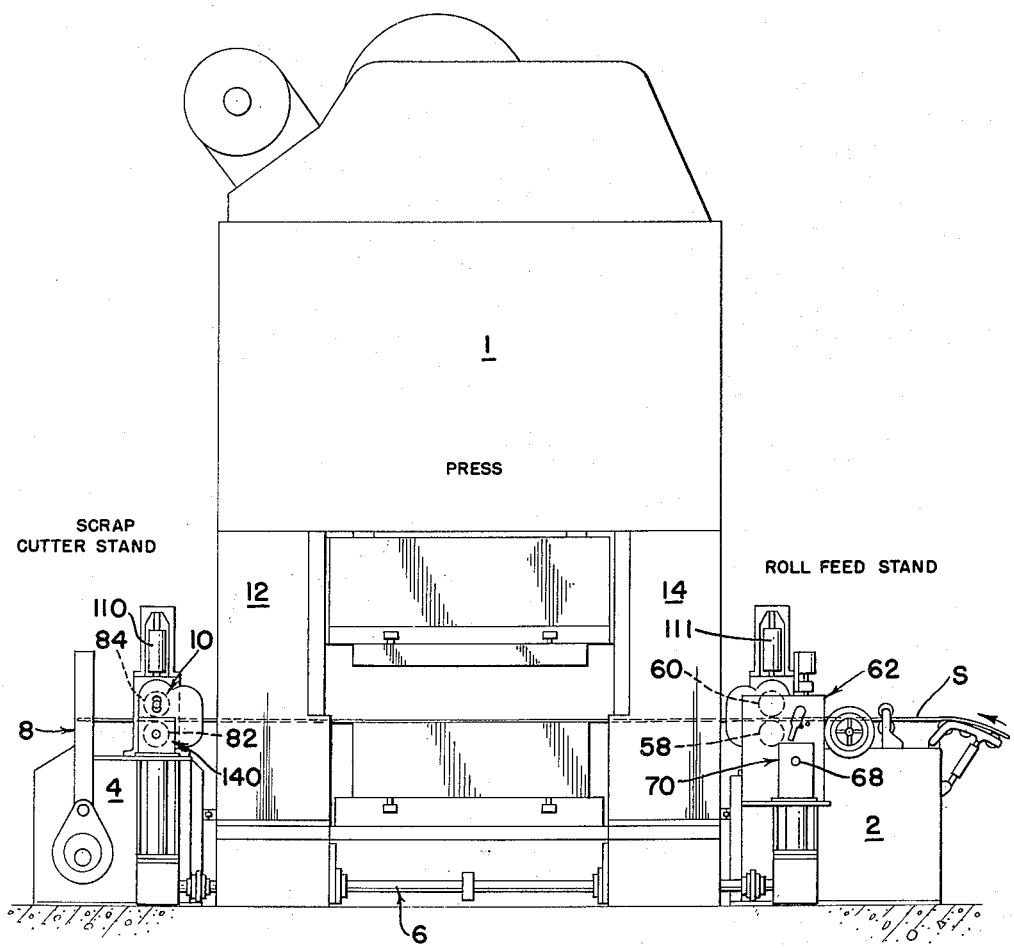
FIGURE 1 is a front elevational view of a press in association with a preferred embodiment of the invention.
Figure 2:
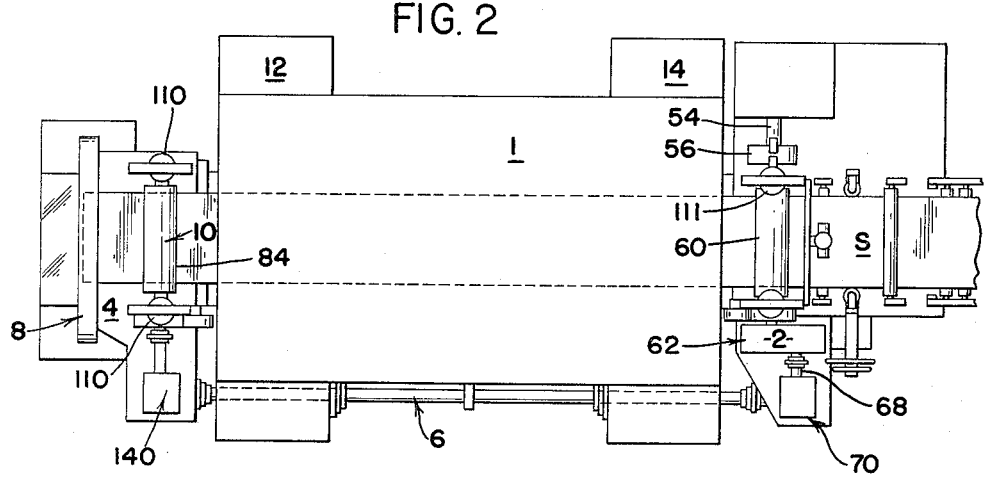
FIGURE 2 is a plan view of the press and preferred embodiment of the invention shown in FIGURE 1.

Reference is now made to FIGURE 1, wherein is shown a press 1 having an ingoing roll feed stand 2 on one side, and an outgoing roll feed and scrap cutter stand 4 on the opposite side. Cross shaft means 6 extends from the ingoing roll feed stand 2 along the floor in front of the press to the outgoing roll feed stand 4 in order that both feeds may be synchronously operated in accordance with the teachings of my invention. Separate drive means power the scrap cutter 8 mounted on the same stand 4 as the outgoing roll feed 10. It will be observed that the press 1 has uprights 12 and 14 in which are provided windows (not shown) through which the steel S can be fed and the scrap removed.

Figure 3:
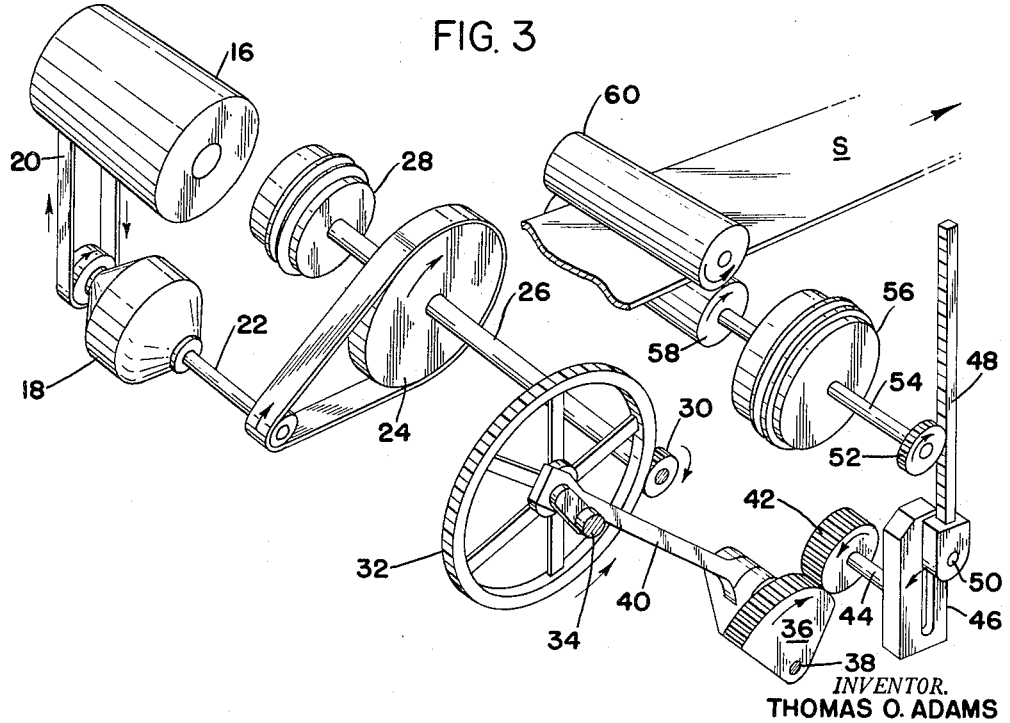
FIGURE 3 is a schematic perspective exploded view of a preferred embodiment of one portion of the invention.

Referring now to FIGURE 3, the major components of the ingoing roll feed unit will be identified and discussed. A main drive motor 16 is coupled to a variable speed adapter unit 18 by belt means 20. An output shaft 22 of the variable speed unit is drivingly connected to a flywheel 24 mounted on a drive shaft 26 having a combination brake and clutch unit 28 mounted on one end of the shaft, and a drive pinion 30 on the opposite end. The drive pinion 30 engages a main gear 32 which is mounted on and drives a crank shaft 34. A sector gear 36 is mounted on a stub shaft 38 and is connected to the crank shaft 34 by means of a crank arm 40. The sector gear 36 engages a pinion 42 mounted on and driving a throw block shaft 44. A heavy duty throw block 46 is mounted on the throw block shaft 44 and rack 48 is pivotally secured to one end of the throw block on pin 50. A pinion 52 is mounted on a roll feed shaft 54 for engagement with said rack 48. A clutch and brake unit 56 is also mounted on said roll feed shaft 54 between the pinion 52 and a drive roll 58. An idler roll 60 is mounted above the drive roll 58 to engage strip therebetween for feeding as will be described in greater detail hereinafter.

Figure 4:
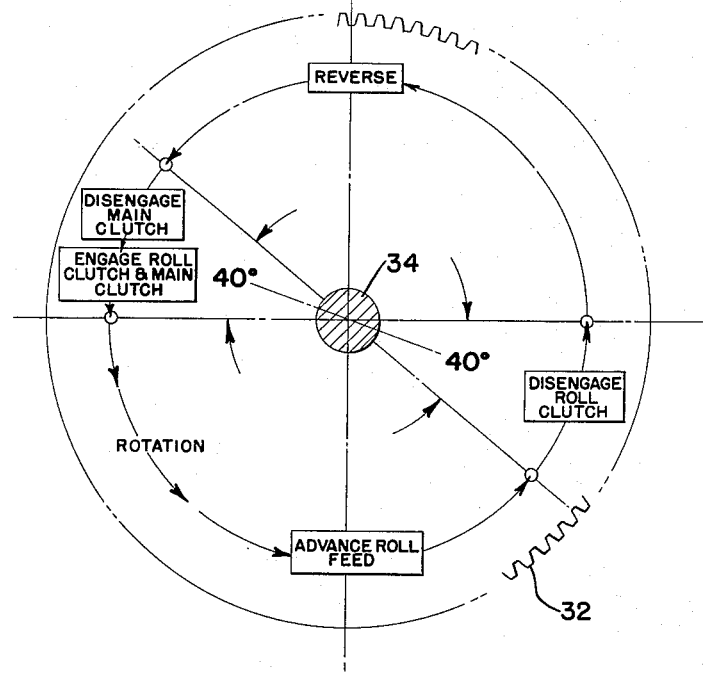
FIGURE 4 is a schematic diagram of a cycle of the operation of the invention and particularly as it relates to the operation of the clutch mechanisms embodied in the invention.
Figure 5:
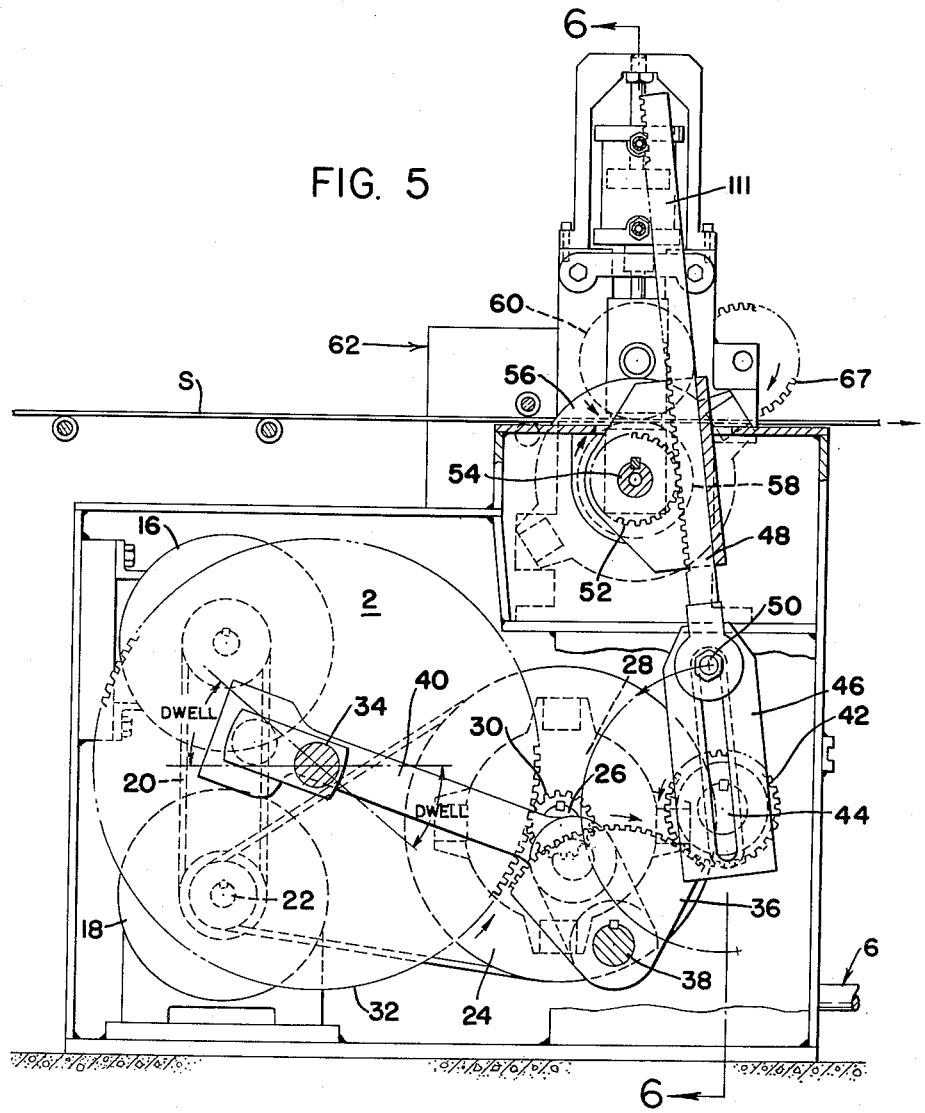
FIGURE 5 is an enlarged elevational view of a preferred embodiment of the invention as viewed from the rear of the press shown in FIGURE 1.
Figure 6:
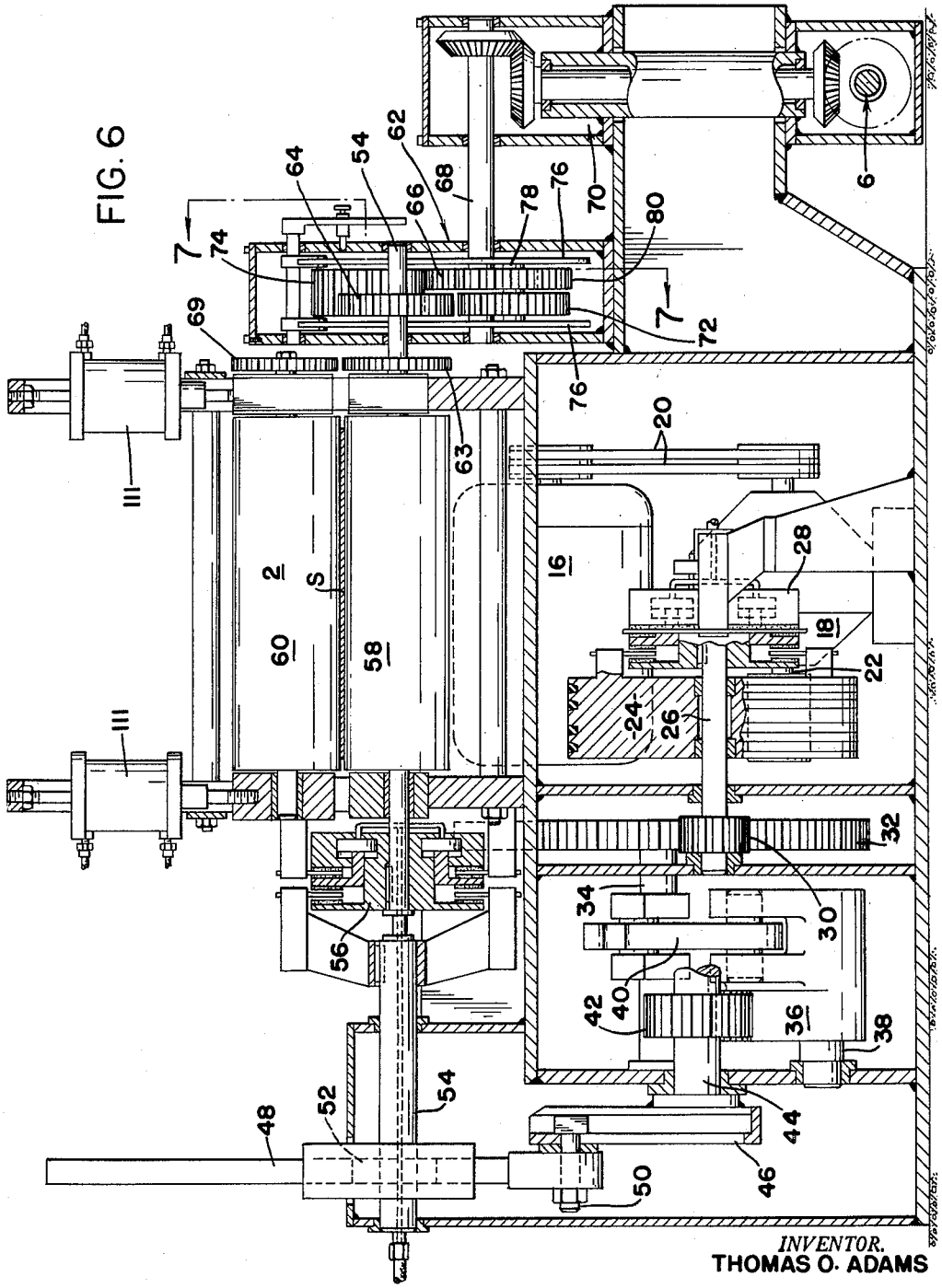
FIGURE 6 is an end view with parts in section of the roll feed mechanism taken on line 6—6 of FIGURE 5.

In view of the experience of users of roll feed equipment that over-running clutches are inherently inadequate to handle heavy duty feeds, I have selected a pair of fluid operable clutch-brake units for use in my invention. These clutch-brake units are of the fail-safe pneumatic variety in which air pressure is employed to engage the clutch, and mechanical means engage the brake upon release of air pressure in the clutch. It is well known, however, that pneumatic clutches, although transmitters of high torque when fully engaged, require time to engage and disengage and that they will slip if engaged under load. Thus, in order to provide intermittent unidirectional rotation of the ingoing roll feed with corresponding stationary periods during which the stock is firmly gripped between the rolls 58 and 60, I have designed co-action between the two unidirectional pneumatic clutches 28 and 56 of my roll feed. Both clutches are engaged at the start of the cycle (see FIGURE 4), and after the crankshaft 34 has rotated 180°, the roll feed clutch 56 will disengage and brake the rolls while the main clutch 28 returns the crank to its starting position, thus completing the cycle. For successful co-action of these air clutches, it is necessary, I have found, to build into the unit a means to provide a dwell period during which the roll feed clutch 56 can be engaged and disengaged. The linkage system as shown in FIGURES 3 and 5 provides a dwell at the roll clutch pinion 52 equivalent to 20° on either side of center every 180° of crank rotation. (See FIGURE 4.) It is during this dwell period that engagement and disengagement of the roll drive clutches is made. Since the roll feed clutch 56 is not in motion during its actuation, but will be fully engaged when a torque demand is made upon it, it will not slip under normally expected load conditions of acceleration and deceleration. If, however, the load should exceed the rate of capacity of the clutch, slippage will occur thereby providing an overload protection which automatically functions to prevent breakage or other damage to shafts and linkage. Like parts are identified by like numerals in FIGURES 5 and 6, which incorporate the schematic concept shown in FIGURE 3 but as translated into a commercial embodiment as actually built and used. Fluid motors 111 (see FIGURES 5 and 6) are provided to release the pressure on upper roll 60 for set-up and maintenance purposes, or cyclically if required by the nature of work being processed. (See FIGURE 4.)

Figure 7:
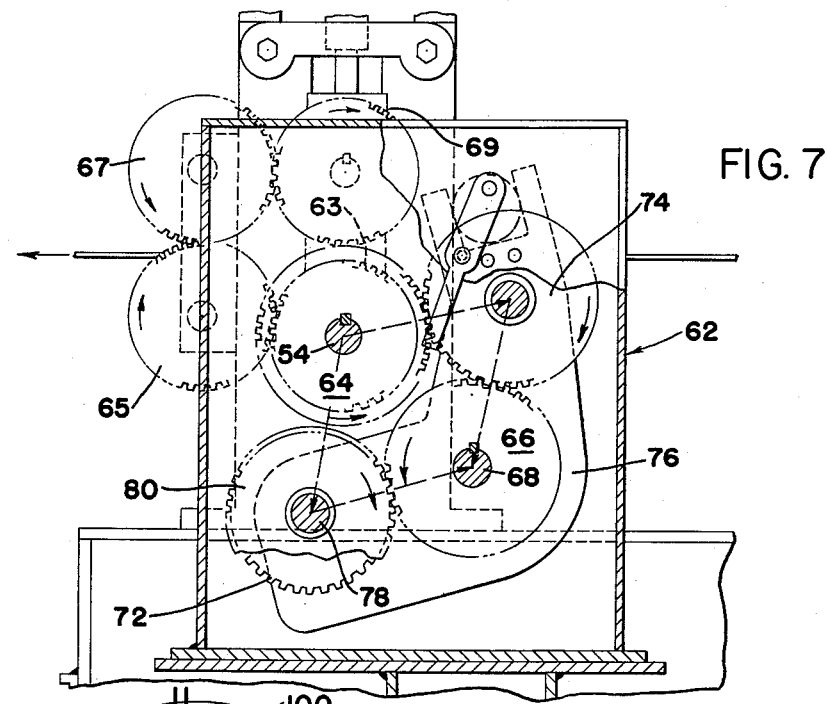
FIGURE 7 is an enlarged fragmentary front elevational view taken on line 7—7 of FIGURE 6, of the roll feed showing the gearing arrangement adapted to drive the input rolls and the power take-off for driving the output rolls.

Another feature of my invention relates to the stock stretch compensation means. To explain the operation of the stock stretch compensator, attention is directed to FIGURE 7 which shows in enlarged detail a side elevation of the interior of the drive gear box 62 also shown in end view in FIGURE 6. The gear change arrangement in the gear box 62 consists of a drive gear 64 mounted on the lower roll shaft 54 of the ingoing feed roll 58, a driven gear 66 mounted on shaft 68 which connects to the cross shaft 6, through mitre gear and shaft means generally designated at 70 of FIGURE 6. So called "square gear" means consisting of gears 63, 65, 67 and 69 are utilized to transmit power from driving roll 58 to driven roll 60. The idler gears 72 and 74 are mounted on a bell crank shaped bracket 76 and pivoted on this bracket around the center of the driven shaft 68. Each of the gears 64, 66 and 74 has the same number of teeth, and gear 72 on the lower idler shaft 78 has one less tooth than the others.

With the bracket 76 in the center or neutral position, neither of the idler gears 72 or 74 mesh with the drive gear 64, the driven gear 66 thus will not rotate and the outgoing feed roll mechanism will be inoperative. The gears on the bell crank would normally be in this neutral position when the work being fed to the press has no skeleton portion to be scrapped. With the bracket 76 in the one-to-one ratio position, the upper idler gear 74 engages the drive gear 64 and driven gear 66, which are both the same size, so that the outgoing feed rolls 82 and 84 (see FIGURE 9) will rotate at the same speed as the ingoing feed rolls 58 and 60. This setting is used for straight blanking wherein the stock stretch is negligible. The third or advanced position is employed when the steel being worked in a press has a tendency to stretch or buckle between the ingoing and outgoing feed rolls. This position employs the smaller idler gear 72 in engagement with the drive gear 64 to cause the driven or output gear shaft 68 to rotate slightly more each cycle than the drive or input shaft 54. Also mounted on idler shaft 78 is gear 80 which is the same pitch diameter, and in meshing engagement with the driven gear 66 to transmit the slight increase in angular speed to the driven gear shaft 68, bevel gear and shaft means 70, and subsequently the outgoing feed rolls 82 and 84.

Figures 10, 11:
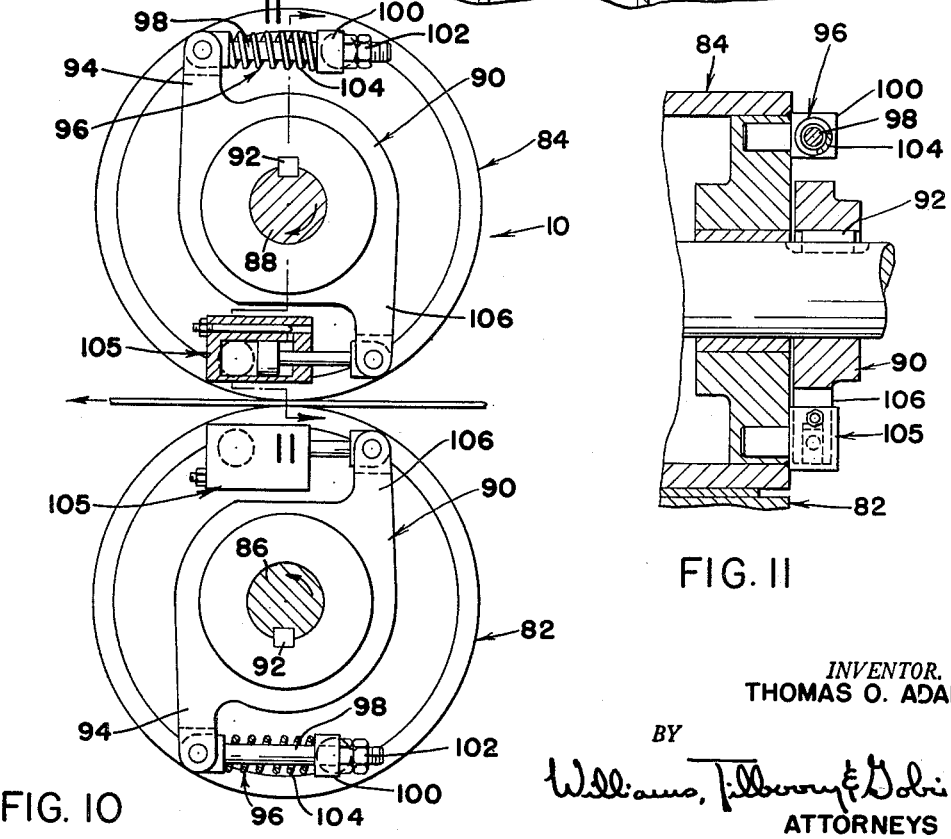
FIGURE 10 is an enlarged detail view taken on line 10—10 of FIGURE 9, with parts in section of the stretch compensating features of the outgoing roll feed.
FIGURE 11 is a fragmentary sectional view taken on the line 11—11 of FIGURE 10; and, FIGURE 12 is an end view of the scrap cutter with parts in section to show the cutting mechanism as well as the independent drive means.

In the advanced position of the above described gear box 62, the outgoing rolls 82 and 84 (see FIGURE 10) would normally index each cycle five-eighths of an inch more than the ingoing feed rolls 58 and 60. Assuming, however, only one-eighth inch of stock stretch per cycle, one-half inch of excess outgoing feed roll rotation must be compensated. To this end, the outgoing feed rolls 82 and 84 are idly mounted on their respective shafts 86 and 88 with roller bearings to permit the rolls to rotate relative to the roll shafts. Since each roll is free to turn on its shaft, drive means from the shaft to the roll is provided by utilization of a spider 90 mounted on each shaft and made integral therewith by key means 92 or the like.

Inasmuch as both rolls are of identical construction, the following discussion will be directed to roll 84, like numbers identifying like parts. Attached to one leg 94 of the spider 90 and to the roll is a lost motion coupling 96 comprising a rod 98 pivotally fastened at one end to leg 94 and slidably fitted in a sleeve 100 secured to the roll 84. A nut 102 is threaded on the sleeve engaging end of rod 98 to retain the rod in said sleeve and contain a spring 104 on said rod between said arm 94 and said sleeve 100. By rotating the spider 90 with the shaft 86 in a clockwise direction, torque is transmitted through the spring 104 to rotate the roll 84. A small air snubber 105 is secured between the other leg 106 of the spider 90 and the roll 84 to cushion the return action of the spring 104 when the rolls are released from engagement with stock therebetween. Thus, if there is only one-eighth inch of stock stretch in the strip, the excess over-travel will be absorbed in compression of the drive springs on the outgoing rolls 82 and 84. When geared to operate at a 1:1 ratio, air snubber 105 acts to lessen compression of spring 104, thereby reducing lost motion between spider 90 and roll 84.

At the latter half of each cycle, the top roll 84 may be lifted by fluid cylinders 110 (see FIGURES 4 and 9) to relieve the gripping pressure on the rolls, whereinafter the springs 104 counter-rotate the rolls clockwise to their initial positions when gear 72 is engaged with 64 of gear box 62 during operations in which stock stretch is experienced. Thus, the rolls reset themselves each cycle during the roll release portion of the cycle, and are prepared during subsequent indexing to compensate for additional stock stretch. As will be seen in FIGURES 8, and 12, the scrap cutter 120 is separately powered for maximum efficiency and includes a separate motor 122, flywheel 124, pinion 126, bull gear 128, and eccentric 130 connected to drive a cutter knife bar 132 co-acting against the lower stationary knife bar 134. Also shown in FIGURES 8, 9 and 12 are mitre gear and shaft means 140 driven by cross shaft means 6 to power outgoing roll 82. Square gear means comprising gears 142, 144, 146 and 148 are employed to transmit power from gear 142 to gear 148. (See FIGURE 8.)

It is to be understood that while only one embodiment of the invention is shown and discussed herein, this embodiment is by way of example only and is not to be construed in a limiting sense. Still other similar arrangements and modifications will be readily suggested to those skilled in the art upon a reading of the specification and examination of the accompanying drawings and such modifications may be resorted to without departing from the scope of the invention, which is intended to be limited only by the appended claims.

I claim:

1. A roll feed of the class described comprising a pair of feed rolls; one of said feed rolls being mounted on an idler shaft, the other of said rolls being mounted on a drive shaft; a fluid operable clutch secured to said drive shaft, said clutch being of the class which transmits maximum torque only when fully engaged before rotation; dwell and reciprocating drive means connected to said clutch; and means to cyclically engage said clutch during a first dwell and to disengage said clutch during a subsequent dwell, whereby said feed rolls are maintainable in continuous positive contact with workstrip for intermittent feeding.

2. A roll feed of the class described comprising: a frame; a pair of feed rolls journaled for rotation in said frame; one of said feed rolls being mounted on a drive shaft; a fluid operable clutch and brake unit secured to said drive shaft; combination cyclic dwell and reciprocating rotational drive means connected to said clutch and brake unit, the clutch portion of said unit being referenced to said drive shaft and the brake portion of said unit being referenced to said frame, said clutch being of the class which transmits maximum torque only when fully engaged before rotation; and means to cyclically engage said clutch and disengage said brake during a dwell and to disengage said clutch and engage said brake during the next subsequent dwell, whereby said feed rolls are maintainable in continuous positive contact with workstrip for intermittent feeding, and said clutch is not fully loaded for maximum torque transmission until fully engaged at rest position.

3. A roll feed of the class described comprising: a frame; a pair of feed rolls journaled in said frame; one of said feed rolls being mounted on a drive shaft; a fluid operable clutch and brake unit secured to said drive shaft; combination cyclic dwell and reciprocating rotational drive means connected to said clutch and brake unit, the clutch portion of said unit being referenced to said drive shaft and the brake portion of said unit being referenced to said frame; and means to cyclically engage said clutch and disengage said brake during a first dwell and to engage said brake and disengage said clutch during the next subsequent dwell; a main drive shaft adapted to drive said dwell and reciprocating rotational drive means; a second fluid operable clutch and brake unit secured to said main drive shaft; and means to actuate said second clutch and brake unit to selectively activate or deactivate said dwell and reciprocating rotational drive means.

4. A roll feed of the class described comprising: a pair of rotatable entry feed rolls, one of said feed rolls being mounted on a drive shaft; fluid operable clutch means connected to said drive shaft; dwell period rotational drive means adapted to intermittently rotate said feed roll drive shaft; means to cyclically engage and disengage said clutch during said dwell periods; a pair of delivery feed rolls idly mounted on shafts; over-drive means connected to said delivery roll shafts; and over-drive compensating means drivingly connecting said over-drive means to said delivery rolls.

5. The roll feed set forth in claim 4, wherein said over-drive means comprises a lost motion spider fixedly secured to each delivery roll shaft and resiliently connected to each idly mounted delivery roll, whereby torque is transmitted from said spider through said resilient means to said roll.

6. A roll feed of the class described comprising: a pair of feed rolls; a first shaft connected at one end to one of said rolls; a first pinion secured to the other end of said drive shaft; clutch means interposed between the ends of said drive shaft; brake means secured to said drive shaft; a rack in engagement with said pinion; a second shaft; a throw block mounted on one end of said second shaft and drivingly engaged to said rack; a second pinion mounted on the other end of said second shaft; a third shaft; a gear sector mounted on one end of said third shaft in driving engagement with said second pinion; a fourth shaft; a main gear mounted on said fourth shaft; a crank eccentrically mounted at one end on said fourth shaft and to said sector gear at its opposite end; means to drive said main gear; and means to intermittently engage said clutch and disengage said brake.

7. A roll feed of the class described comprising: a pair of feed rolls, one of said feed rolls being mounted on an idler shaft, and the other of said feed rolls being mounted on a drive shaft; a gear means mounted on said drive shaft; rack means in driving engagement with said gear means; rotatable dwell providing throw block means secured to said rack means for reciprocating engagement therewith; fluid clutch means mounted on said drive shaft and interposed between said driven roll and said gear means, said clutch being referenced to said drive shaft and being of the type which transmits maximum torque only when fully engaged before rotation; and means to cyclically engage said clutch during a dwell period provided by said throw block means, and to disengage said clutch during the next subsequent dwell period provided by said throw block means, whereby maximum torque is intermittently transmitted to said drive shaft by said clutch which is fully engaged at rest and rotated only after being fully engaged.

References Cited in the file of this patent

UNITED STATES PATENTS

| | | |
|---|---|---|
| 1,851,753 | Crane | Mar. 29, 1932 |
| 2,658,406 | McIlvain | Nov. 10, 1953 |
| 2,729,447 | Groll | Jan. 3, 1956 |